United States Patent [19]

Moehrmann

[11] 3,757,221

[45] Sept. 4, 1973

[54] AUTOMATIC EQUALIZER SYSTEM FOR PHASE-MODULATED DATA SIGNALS

[75] Inventor: Karlheinz Moehrmann, Munich, Germany

[73] Assignee: Siemens Aktiengesellschaft, Berlin and Munich, Germany

[22] Filed: June 2, 1971

[21] Appl. No.: 149,258

[30] Foreign Application Priority Data

June 4, 1970 Germany .................. P 20 27 544.9

[52] U.S. Cl. ...................... 325/42, 325/65, 328/155, 333/18 R

[51] Int. Cl. ............................................ H03h 7/36

[58] Field of Search ........................ 315/41, 42, 400, 315/477, 65; 333/18, 28 R, 70 T; 328/155, 165

[56] References Cited

UNITED STATES PATENTS

| | | | |
|---|---|---|---|
| 3,479,458 | 11/1969 | Lord | 333/18 X |
| 3,445,771 | 5/1967 | Clapham | 333/18 X |

*Primary Examiner*—Benedict V. Safourek
*Attorney*—Curt M. Avery, Arthur E. Wilfond, Herbert L. Lerner and Daniel J. Tick

[57] ABSTRACT

An automatic equalizer system for phase-modulated data signals, which is provided on the receiving side of a band-limited transmission channel and is connected with a receiver via a demodulator, comprises an equalizer which has N filter members with N respective outputs. N-1 outputs are connected with the inputs of a computer and all N outputs are connected via N variable circuit elements with the inputs of an adder; the output of the transmission channel is connected with the computer on the one hand via a sync recovery circuit and on the other hand, via a reference clock provided with a synchronization device. N-1 outputs of the computer are associated with those N-1 variable elements whose inputs lead simultaneously to the inputs of the computer, in such a manner as to effect an adaptive adjustment of the variable circuit elements. The output of the equalizer is connected via automatic gain control means with that variable element of the equalizer which is associated with the filter member whose output does not lead to the computer.

12 Claims, 9 Drawing Figures

INVENTOR

BY KARLHEINZ MOEHRMANN

INVENTOR
BY KARLHEINZ MOEHRMANN

75 TO 78; SAMPLE & HOLD CIRCUITS

INVENTOR

BY Karlheinz Moehrmann

INVENTOR

BY KARLHEINZ MOEHRMANN

INVENTOR

BY KARLHEINZ MOEHRMANN

AUTOMATIC EQUALIZER SYSTEM FOR PHASE-MODULATED DATA SIGNALS

My invention concerns an automatic equalizer for phase-modulated data signals, which is provided on the receiving side of a band-limited transmission channel and is connected with a receiver through a demodulator. As is well known, different modulation methods are used for the transmission of digital data signals. One of these methods consists in translating the data signal on the transmitter side into the transmission range of the transmission channel by means of phase modulation. Here, the undistorted modulated signal has a defined, constant phase during a given time interval, the so-called modulation interval. Because of the band limitation and the distorting properties of the transmission channel, a signal arriving on the receiving side exhibits amplitude and phase distortion. In this connection an automatic equalizer for four-phase keyed signals has, for instance, become known from a publication (An Automatic Optimizer for the Adjustment of the Pulse Equalizer in a Data Transmission System) in the German periodical Journal AEU, Vol. 18 (1964) p. 271 to 278. This equalizer adjusts itself during the normal flow of information, the variable elements of the equalizer being adjusted serially, i.e., sequentially in time. This equalizer, therefore, requires a relatively long adjustment period, which in modern data transmission systems is no longer tolerable.

Further known (German Pat. No. 1 210 037) is a method for the automatic equalization of signals which comprise steep pulse flanks in the undistorted condition. If however, a phase-modulated signal is used, steep flanks no longer appear in the modulated signal, mainly as a result of the definitely necessary band limitation in the signal transmission. This known system, therefore, concerns a problem different from the objects, presently stated, of my invention.

It is an object of my invention to obviate in a relatively simple manner the difficulties initially mentioned above. More particularly, it is an object to provide an automatic equalizer which is capable of equalizing phase-modulated data signals and which adjusts itself in so short a time that distortionless transmission of the phase-modulated data signals is assured at all times.

To achieve these objects, and in accordance with a feature of my invention, an automatic equalizer for phase-modulated data signals, situated on the receiving side of a band-limited transmission channel and connected with a receiver via a demodulator is given the structure of a filter bank consisting of N filters with N outputs, of which N-1 outputs are connected with the inputs of a computer, and all N outputs are connected through N variable elements with the inputs of an adder; N-1 outputs of the computer are associated with those N-1 variable elements, whose inputs lead simultaneously to the inputs of the computer, in such a manner that an adaptive adjustment of these variable members is achieved. The output of the equalizer is connected through an automatic gain control with that variable element of the equalizer that is associated with the filter member whose output does not lead to the computer (N=2, 3, 4 . . . ).

In the following, the invention will be explained in more detail with reference to embodiments illustrated by way of example on the accompanying drawings, in which FIG. 1 is a schematic diagram of an equalizer according to the invention.

Figure 2:
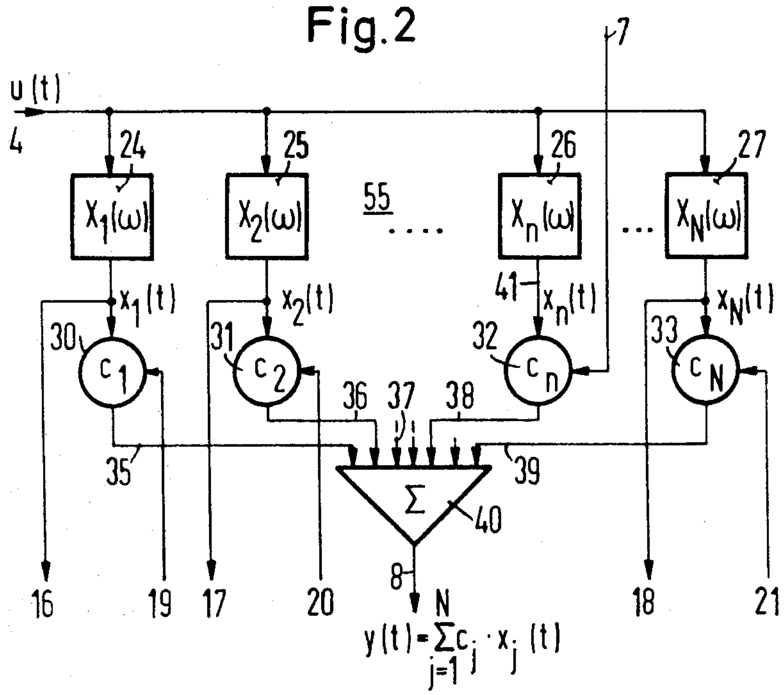
FIG. 2 shows schematically the structure of a filter bank suitable for an equalizer according to FIG. 1.
Figures 3, 4:
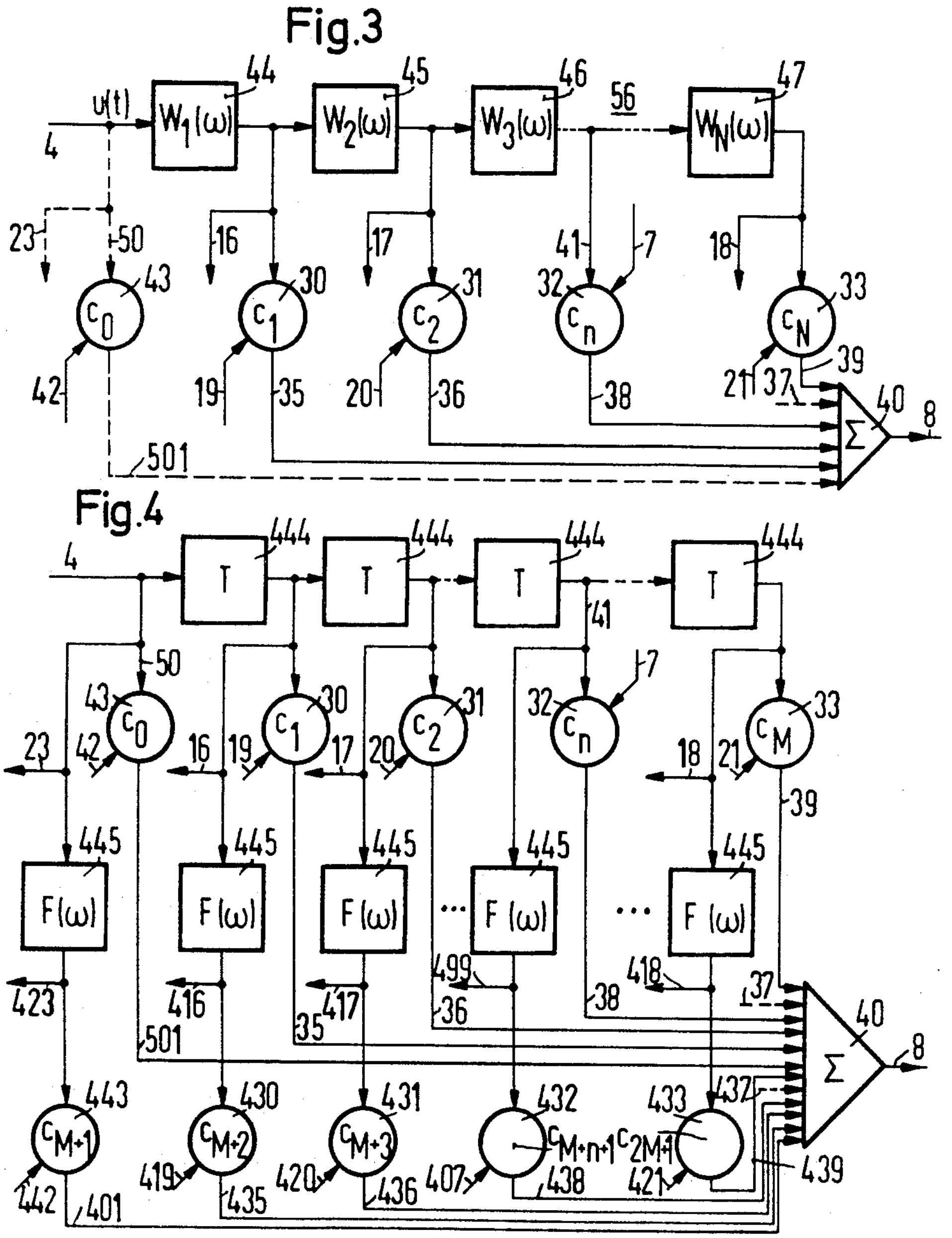
FIG. 3 shows a specific design of the same filter bank.

FIG. 4 another design of a filter bank according to FIG. 2.

Figure 5:
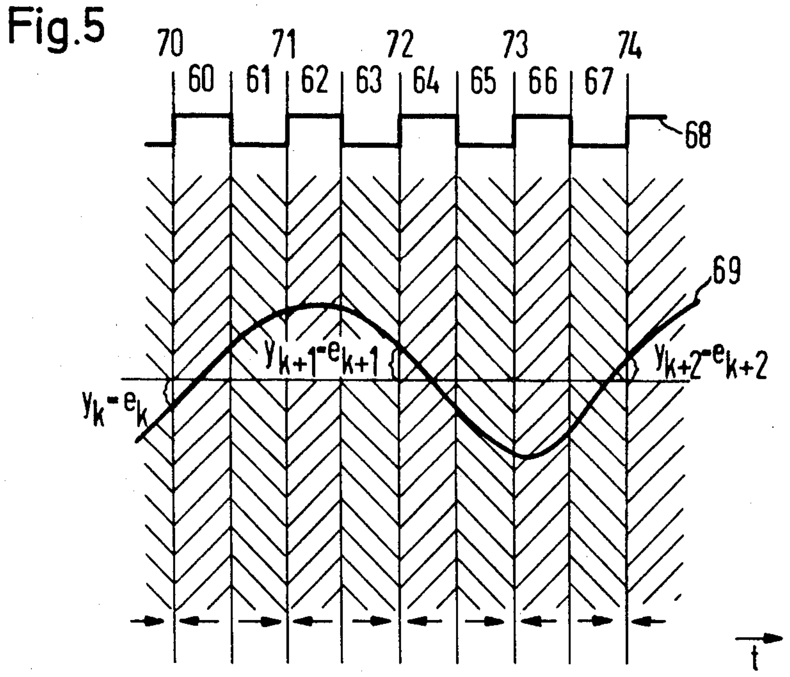
Figure 6:
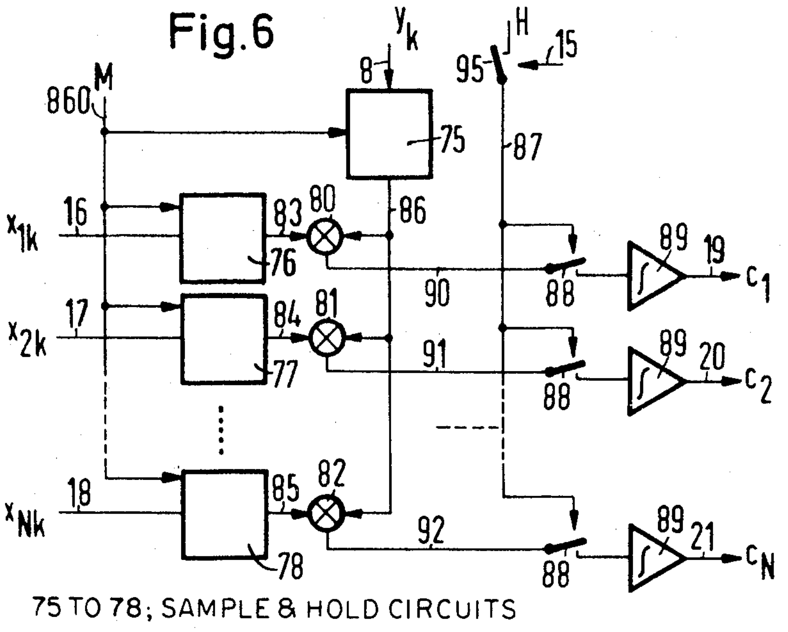
Figure 8:
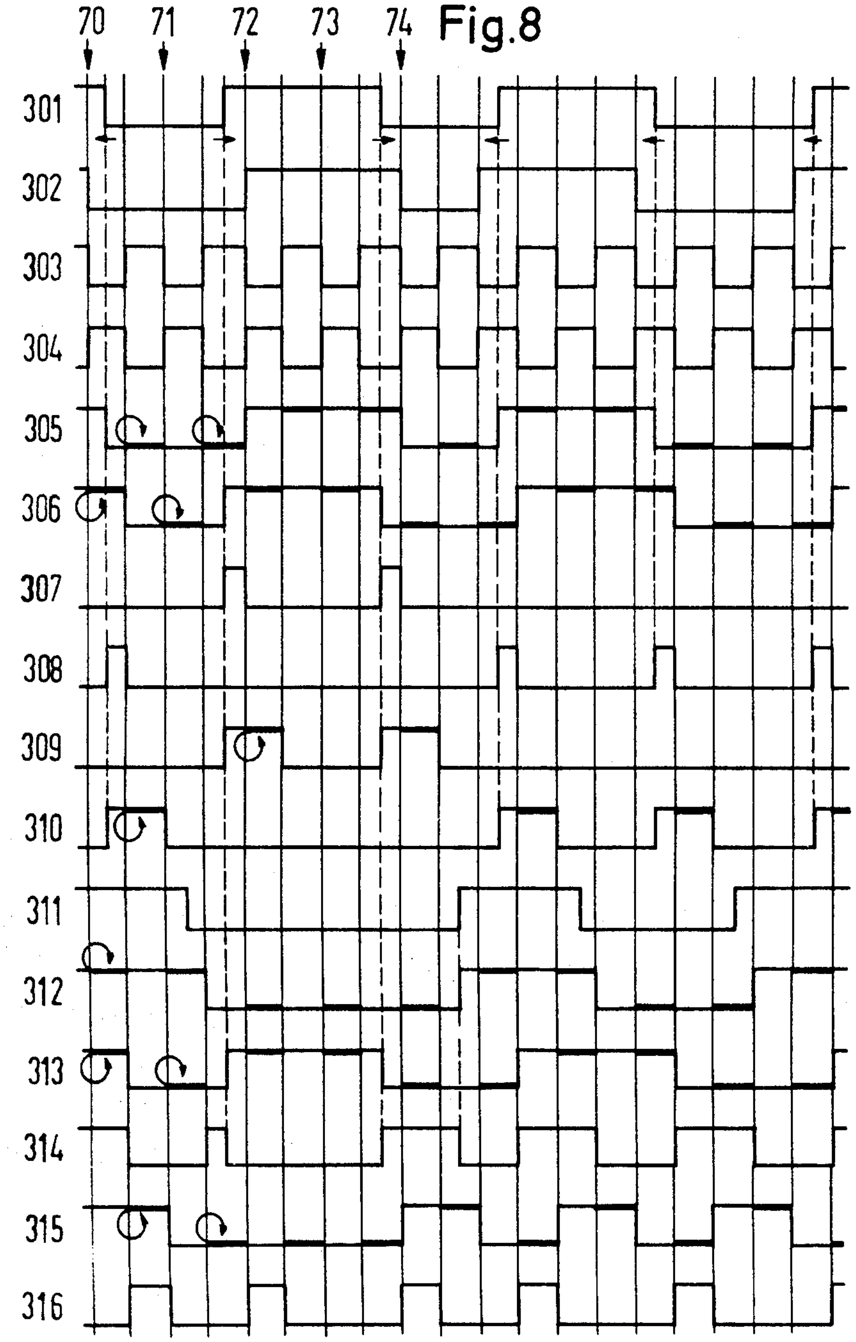
Figure 7:
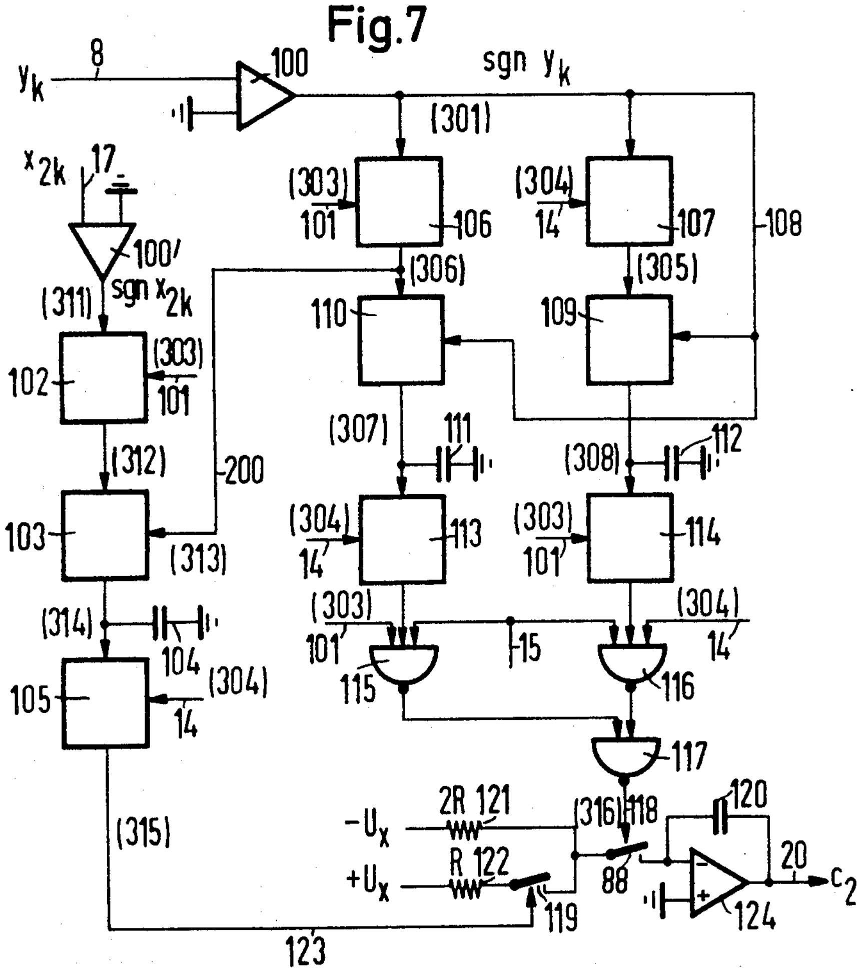
Figure 9:
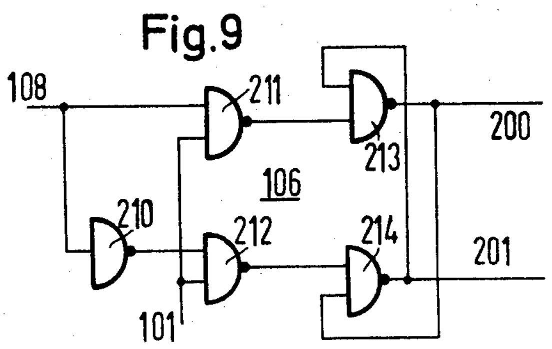

FIG. 5 is a timing diagram to illustrate the operation of the equalizer;

FIG. 6 represents an arrangement for the automatic adjustment of the equalizer;

FIG. 7 is the circuit diagram of a specific embodiment of the circuitry according to FIG. 6;

FIG. 8 is a pulse diagram to illustrate the operation of the circuit according to FIG. 7;

FIG. 9 is a circuit diagram of a so-called RS flipflop which is used in the circuit according to FIG. 7.

Figure 1:
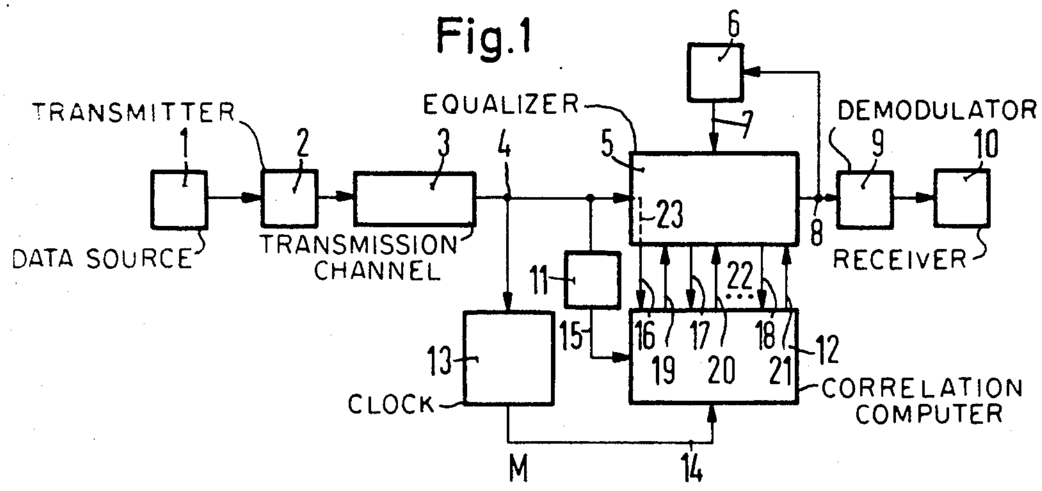

Referring to FIG. 1, the illustrated basic structure of an automatic equalizer in a data transmission channel comprises data source 1 which passes the signals to be transmitted to a data transmitter 2. In this data transmitter the data to be transmitted are converted into phase-modulated signals and arrive at the input of the transmission channel 3. The output 4 of the transmission channel 3 is connected to the input of the equalizer 5 whose output 8 leads to a demodulator 9 in which the phase-modulated signal is demodulated. The output of the demodulator 9 is connected with the data receiver 10.

The design details of the equalizer 5 are shown in FIG. 2 which should be viewed in conjunction with FIG. 1.

The equalizer 5 has the structure of a filter bank 55 consisting of N filters 24 to 27, only four filters being shown for the sake of clarity. All filters 24 to 27 are fed by a common input 4. The filter bank 55 has N outputs 16, 17, 18 and 41. Of these N outputs, N-1 (in the present example, the outputs 16 to 18) are connected with the inputs of the correlation computer 12 shown in FIG. 1, and all N outputs 16, 17, 18 and 41 lead via N variable elements 30 to 33 to the inputs 35 to 39 of an adder 40. The sum output 8 of the summer (adder) 40 also constitutes the output of the equalizer 5. The output 4 of the transmission channel 3 in FIG. 1 is connected with the correlation computer 12, on the one hand via a sync recovery circuit 11 and the line 15, and on the other hand via a reference clock 13 with a synchronization device and the line 14. N-1 outputs 19 to 21 of the correlation computer 12 are associated with those N-1 variable elements 30, 31, 33, the inputs of which lead at the same time to the inputs of the correlation computer 12, in such a manner that an adaptive adjustment of these variable elements 30, 31, 33 is achieved. The output 8 of the equalizer 5 is connected with the variable element 32 of the equalizer 5 via an automatic gain control 6 and the line designated with 7 in FIGS. 1 and 2. This variable element 32 is associated with the filter section 26, the output 41 of which does not lead to the correlation computer 12. N is here an integral number which is equal to or larger than 2 ($N \geq 2$).

The requirements for the equalizer 5 are that it should be capble of being adaptively adjusted in the simplest possible manner and in a time as short as possible. Furthermore, the equalizer 5 should be capable of eliminating as completely as possible the linear distortion of the received signal. As will be shown later, the general equalizer structure shown in FIG. 2 meets the requirement of a simple adaptive adjustment capability. Such a structure is known, for instance, from the publication "An Automatic Equalizer for General-Purpose Communication Channels" in Bell System Technical Journal, November 1967, p. 2179 to 2208. As is shown there, the impulse response of a system can be approximated with the aid of suitable networks $X_j(\omega)$ by a sum of functions weighed with real, constant factors $c_j$.

For the transfer function of an equalizer according to the arrangement shown in FIG. 2 applies $$H(\omega)=\sum_{j=1}^{N} c_j \cdot X_j(\omega) \quad (1)$$

where $j$ is an integral counting variable.

It is advantageous if the responses to a modulated rectangular pulse of the duration of a modulation interval are mutually orthogonal at the outputs of the partial filters $X_j(\omega)$, so that the time-averaged mean value of the product of two such responses becomes zero. Then there is no coupling between the individual adjustment coefficients $c_j$; they can be adjusted independently of each other. In the operation of the equalizer, no ideal, undistorted modulated signal will, of course, occur at the filter input 4, but distorted signals will appear which extend over a time interval longer than a modulation interval. This results in a certain degree of mutual interdependence of the adjustment coefficients $c_j$. However, this is negligible unless the distortions are extreme. Orthogonality between the individual modulated rectangular responses at the outputs 16 to 18 and 41 is therefore desirable, but in no way absolutely necessary.

An automatic equalizer can be designed also by providing, instead of a filter bank 55, a filter chain 56 with taps 16 to 18, 41. Such an arrangement is shown in FIG. 3. The input 4 of the equalizer 5 leads to the input of the first filter 44 of the filter chain 56 with the transfer function $W_1(\omega)$. The first filter 44 is followed in the chain by the filters 45, 46 to 47 with the transfer functions $W_2(\omega)$ to $W_N(\omega)$. The filter chain thus consists again of N filters, as in the case of the filter bank 55 shown in FIG. 2. For the sake of clarity only four filters are shown and the dashed line between the filters 46 and 47 is to indicate the existence of further filters. The filter chain 56 also has N outputs, of which N-1 (outputs 16 to 18) are connected with the inputs of the correlation computer 12 in FIG. 1 and all N outputs (16 to 18, 41) are connected via N variable elements 30 to 33 with the inputs 35 to 39 of the summer 40. The input 8 of the summer 40 constitutes again the output of the equalizer 5 in FIG. 1. The circuit in FIG. 3 is completely equivalent to the circuit shown in FIG. 2 if the following conditions apply:

$$X_1(\omega) = W_1(\omega) \quad (2)$$

$$X_2(\omega) = W_1(\omega)\cdot W_2(\omega) \quad (3)$$

$$X_3(\omega) = W_1(\omega)\cdot W_2(\omega)\cdot W_3(\omega) \text{ etc.} \quad (4)$$

This chain circuit has the advantage that some part of the filtering function, in the case of the filters with the higher index numbers, was already performed by the preceding filters, so that the order of the partial filters need not become greater with increasing index number. Such chain structures can therefore generally be realized with considerably smaller cost.

It is advantageous to design the filter elements 44 to 47 in the filter chain 56 as delay elements. This results in the well-known transversal filter with $$x_j(t) = u(t-j\tau) \quad (5)$$

at the $j^{th}$ tap if $u(t)$ represents the signal at the input 4 and $\tau$ is the delay between two adjacent taps.

Filter structures of the transversal type can be used economically especially if an equalizer is realized with purely digital techniques.

Here the input 4 of the filter chain 56 is connected advantageously on the one hand directly with a further input of the correlation computer 12 and on the other hand via an additional variable member 43 and the line 501 with the adder 40, which is included in the equalizer 5. The control of the additional variable element 43 is also accomplished in a suitable manner by the correlation computer 12 via the line 42.

Independent equalization is possible only in a frequency interval $$n\pi/\tau \leq w \leq ((n+1)\pi/\tau) \quad (6)$$

because of the periodicity of the transfer function of the transversal filter.

In the transversal filter the delay between adjacent taps must therefore be chosen sufficiently small. If $\tau$ is smaller than the duration of one modulation interval, the individual variable elements are mutually coupled to a certain extent, as the desired orthogonality between the individual modulated rectan-gular responses at the outputs 23, 16 to 18, 41 no longer exists. This coupling can lead to difficulties in the operation of the equalizer.

A filter structure which avoids the above-mentioned difficulty was described in the already cited publication "An Automatic Optimizer for the Adjustment of the Pulse Equalizer in a Data Transmission System" in AEU Vol. 18 (1964) p. 271 to 278. This filter can be modified so that Equation (1) is fulfilled. The resulting filter constitutes a combination of the circuits shown in FIGS. 2 and 3 and is presented in FIG. 4.

The input 4 of the filter leads to a chain of like delay elements 444, each of which has the delay T, where T is equal to the duration of one modulation interval (bit). As in the filter chain according to FIG. 3 each tap between two delay elements, as well as the input and output of the filter chain, is connected with one variable element 43 and 30 to 33. Elements with the same functions are designated as in FIG. 3 and will not be explained again.

Additionally, each tap and the input and output of the filter chain is connected with the input of a further filter 445. The outputs of the similar additional filters 445 are connected, on the one hand, via the lines 423, 499 and 416 to 418 with further inputs of the correlation computer 12, and on the other hand, via further variable elements 443 and 430 to 433 and via the lines 401 and 435 to 439 with further inputs of the summer 40. The control of the further variable elements 443, 430 to 433 is accomplished likewise in a suitable manner via the lines 407, 442, 419 to 421 by the correlation computer 12.

The additional filters $F(\omega)$ constitute wideband 90° phase shifters, so-called Hilbert transformers. They rotate the phase in the frequency range under consideration by 90°, independent of frequency. If this range is not too wide in relation to its center frequency, these phase shifters can also be replaced by differentiating or integrating circuits or by all-pass filters which effect approximately a phase rotation of 90° in the frequency range under consideration with approximately constant amplitude. The operation of the filter is explained in the already cited publication. This filter structure exhibits the desired orthogonality properties. The filter according to FIG. 4 contains a total of 2M+1 variable elements, M being an integral number.

In the following the method for the automatic adjustment of the equalizer structures described above will be described in further detail.

The data signals to be transmitted are in general quantized, i.e., the signal can assume only a finite number of different amplitude values if, for instance, multilevel PAM is to be transmitted. In the transmission by means of phase-modulated signals the modulation is accomplished so that two or more bits are simultaneously transmitted per unit of time, i.e., per so-called modulation interval.

In order to be able to equalize a data signal adaptively, it is necessary that this signal be redundant. The redundancy of the modulating signal consists in the above-mentioned quantization has the effect that the transmitted modulated signal has within a modulation step a zero crossing only at closely defined, discrete times. This property can be used for the adjustment of an adaptive equalizer. The use of this criterion appears particularly meaningful because the times of the zero crossings contain the information to be transmitted directly.

Any linear distortion of the signal results in a time deviation of the zero crossings from the reference (nominal) times and therefore in a faulty phase information. The equalizer should therefore be adjusted so that the zero crossings take place only at the desired points in time.

The desired points in time can generally be defined readily only within the individual modulation intervals, as the zero crossing of the signal in the transition between two modulation intervals can take place at quite different times, depending on the length T of the modulation interval. This zero crossing can therefore not be used directly for the adjustment of the equalizer. Because of the band limitation of the signal the zero crossings do not agree, even in the case of an undistorted signal, in the vicinity of the transitions between the individual modulation intervals. Therefore, only zero crossings can be utilized for the adjustment of the equalizer which are situated in the center of the modulation intervals. These regions must be gated out be means of suitable sampling pulses.

These sampling pulses are obtained from the distorted signal at the channel output 4 by means of the sync recovery circuit 11. As is described, for instance, in the CCITT Special Study Group A, Contribution No. 192, dated Apr. 24, 1968, on p. 2 and 3, a small amplitude modulation can be superimposed for this purpose to the phase-modulated signal, in order to receover on the receiving side for randomly transmitted data text the sampling clock rate at the center of the modulation interval.

In the case of fast data transmission over telephone channels, the phase-modulated signals will exhibit as a rule only very few zero crossings within one modulation interval. As, however, only the zero crossings at the center of the individual modulation intervals can be used for the adjustment of the equalizer it is advisable to subject the signal to be equalized, prior to equalization, to a frequency translation through single-sideband modulation. The entire spectrum of the signal is translated to a higher frequency, where within one modulation interval a sufficient number of zero crossings occur.

To illustrate the method for the automatic adjustment of the equalizer, only four-phase keying is assumed in the following for the sake of simplicity. The considerations applicable here, however, can be directly expanded to include eight-phase keying.

The requirement for an automatic equalizer adjustment as simple as possible can be met relatively simply always if the output signal $y(t)$ of the equalizer 5 can be represented as a sum of weighted partial signals $x_j(t)$, and if on the receiving side an estimated value of the correct, transmitted ideal signal $a(t)$ can be derived (FIG. 2). Let the signal $y(t)$ have the form shown in Equation (7).

$$y(t) = \sum_{j=1}^{N} c_j \cdot x_j(t) \qquad (7)$$

In the circuit according to FIG. 3, j is counted from O to N, in the circuit according to FIG. 4 from O to 2M+1. On the basis of the explanations above, this difference is self-evident and will not be discussed further in the following. The squared error D of the signal $y(t)$ is $$D = \int_{-\infty}^{\infty} \{y(t) - a(t)\}^2 dt \qquad (8)$$

and with the requirement $$D = \text{minimum} \qquad (9)$$

we must have:

$$\frac{\partial D}{\partial c_j} = 2\int_{-\infty}^{\infty} \{y(t) - a(t)\} \frac{\partial y(t)}{\partial c_j} dt = 0 \qquad (10)$$

as in the ideal case $a(t)$ is an ideal signal, independent of $c_j$.

With Equation (7), however, we have $$(\partial y(t)/\partial c_j) = x_j(t) \quad (11)$$

so that the requirement applies that $$\frac{\partial D}{\partial c_j} = 2\int_{-\infty}^{\infty} \{y(t) - a(t)\} x_j(t)\,dt = 0 \quad (12)$$

or, if the signal is considered only at individual sampling times $$\sum_{k=-\infty}^{\infty} (y_k - a_k) x_{jk} = 0 \quad (13)$$

Equation (13) therefore signifies minimization of the squared error. Here $y_k = y(kT)$, $a_k = a(kT)$, $x_{jk} = x_j(kT)$. It is obvious that the equalizer structures shown in FIGS. 2, 3 and 4 furnish a signal which meets the requirements described, because it can be represented in the form of Equation (7).

The described adjustment criterion necessitates the formation of an ideal signal. The construction of a phase-modulated ideal signal from a distorted signal is in general a difficult task. However, if the distorted signal is viewed only at certain points in time when the ideal signal, if it existed, would just go through zero, the derivation of a criterion would be greatly facilitated, as the ideal signal then becomes unnecessary. This way of looking at the situation makes sense here because the transmitted information is contained in just these zero crossings. The problem of obtaining an ideal signal is therefore reduced to the problem of determining the nominal points in time at which a distortion-free signal would go through zero.

FIG. 5 serves to illustrate the situation described.

In FIG. 5 is shown a section of a distorted, phase-modulated signal, which is labelled with 69. The nominal instants for the zero crossings, in the following called "normal times," which are designated with the reference numbers 70 to 74, are predetermined by the positive flank of a reference clock frequency $n \cdot f_T$, where $n$ is the number of the possible phase angles. It is assumed here that the phase angle, in the case of four-phase keying, changes by $n \cdot \pi/2$ between two modulation intervals, with $n=0, 1, 2, 3$. Phase jumps of $\pi/4$ are to be excluded. However, the method can in principle be extended to signals which contain phase jumps of $m \cdot \pi/4$, $m$ being an integral number, or in the case of eight-phase keying, to signals with phase jumps of $m \cdot \pi/8$. This reference clock rate is designated in FIG. 5 with 68. It is supplied by a reference clock generator 13 (see FIG. 1). This reference clock generator supplies the reference clock frequency 68, which is synchronized by means of a suitable synchronizing arrangement by the zero crossings of the distorted signal at the output 4 of the transmission channel 3. The phase of this reference clock signal is controlled by means of a circuit, known per se, for phase synchronization, for instance, based on the averaged zero crossings of the arriving distorted signals. The phase synchronization arrangement can also compensate for minor deviations of the local oscillator frequency from the transmitted frequency. Therefrom results the normal time raster 68 shown in FIG. 5 and it is required of the signal at the equalizer output 8 that it should pass the zero line only at the "normal times." These considerations refer, of course, as was already mentioned, only to zero crossings in the center of the individual modulation intervals, where no disturbances of the zero crossings occur due to band limitations or discontinuities at the transitions between the individual modulation intervals.

The time raster 68 is subidivided into the individual regions 60 to 67. The possible nominal instants for a zero crossing of the signal are given by the normal times designated in FIG. 5 with 70 to 74. If the distorted signal passes, for instance, the zero line in the region 60 it will be assumed that the corresponding ideal signal crosses the zero line at the instant 70. If the point of intersection is, for instance, in the region 67, it is assumed that the ideal signal intersects the zero line at the instant 74. A correction is to be applied always in the appropriate direction.

The method operates as follows:

Each time when the signal passes through zero in a region, for instance, 64 in FIG. 5, adjacent to a normal time, for instance, 72, the error $e_k$ at this normal time, which had been placed in short-time storage by some means, is multiplied by the signal $x_j$, which was measured at the same normal time and had also been put in short-time storage, and the product is applied to the input of an integrator for a certain defined time. Thus, the quantity of interest, $\delta D/\delta c_j$, is formed according to Equation (13). This quantity controls $c_j$ in such a manner that $\gamma D/\gamma c_j$ goes to zero. For the intermediate storage, sample-and-hold circuits are required.

The equalizer will then adjust itself so that at the instants considered the output signal is equal to the ideal signal, i.e., goes through zero at the correct instants. It will be seen from FIG. 5 that the distortions must not be too extreme, as otherwise the zero crossings will fall into the wrong region and the correlator thus receives a false signal, whereby the correction would be made in the wrong direction. In this kind of equalization one degree of freedom is still open; as only the position of zero crossings is controlled, no statement is yet made regarding the amplitude of the equalized signal.

The total signal is composed, according to Equation (7), of a sum of partial signals:

$$y(t) = \sum_j c_j \cdot x_j(t) \quad (7)$$

However, any signal can fulfill the condition of defined zero crossings which has the form $$y'(t) = k \cdot \sum_j c_j \cdot x_j(t) \quad (14)$$

where $k$ is an arbitrary constant.

Therefore a tap, for instance, $c_n$ in FIG. 2, FIG. 3 or FIG. 4, can be set to a fixed value and the equalizer output signal at the output 8 is fed via an automatic gain control 6 to the variable element 32 of the equalizer 5, which is associated with the filter member 26, the output 41 of which does not lead to the correlation computer 12. The correlation computer 12 is thus designed in such a way that for the purpose of adaptively adjusting the variable elements 30, 31, 33, 43, ontrolled by it, it forms the partial derivatives of the sum of the error squares at the instants of the "normal" zero crossings 70 to 74 at the center of the modulation intervals in such a manner that the differentiation is performed with respect to the coefficients $c_j$ associated with these variable elements 30, 31, 33, 43. The subscripts $n$ and $j$, respectively, represent here integral, running variables. As the coefficient $c_n$ is adjusted via the automatic gain control, $n \neq j$ will apply here and in the following.

The circuit for the implementation of the described method of adjustment for the adaptive equalizer is shown in FIG. 6. Every time the signal goes through zero in a region adjacent to a normal time, the error $e_k$ at this "normal" instant of time is intermediately stored for a short time by means of the sample-and-hold circuit designated in FIG. 6 with 75. A sample-and-hold circuit is capable of storing a sampled amplitude value for a predetermined period of time. Such circuits are known, for instance, in conjunction with A/D converters. The partial signals at the outputs 16 to 18 of the filter bank according to FIG. 2 or FIG. 4, or of the filter chain according to FIG. 3, respectively, are sampled at every normal time instant and the information is intermediately stored in the sample-and-hold circuits 76 to 78. As the sampling clock frequency the reference clock frequency here designated with M and with 68 in FIG. 5 is applied to the control line 860. For every positive flank of the reference frequency 68 a sampling of the signals on the lines 16 to 18 takes place and, of course, also of the equalizer output signal on the line 8, and the respective instantaneous values of the signals are transferred to the sample-and-hold circuits 75 to 78. Every time when the signa goes through zero in a region adjacent to a normal time instant, for instance, 72 in FIG. 5, the instantaneous value stored at this time in the sample-and-hold circuit corresponds to the error occurring at this normal time, for instance to the error $e_{k+1}$ in FIG. 5 at the time 72. The output signals of the sample-and-hold circuits are fed to the first inputs of multipliers 80 to 82 via lines 83 to 85. To the second inputs of the multipliers 80 to 82 is fed the output signal of the sample-and-hold circuit 75 via the line 86. The output signals of the multipliers, i.e., the products of the quantities $x_{jk}$ and $y_k$, are fed to the integrators 89 via the lines 90 to 92 and the switches 88. The switches 88 are operated via the line 87 at an auxiliary clock frequency designated with H in FIG. 6. The switches 88 are closed only for a definite, constant period if the signal has gone through zero in a region adjacent to a normal time instant. The generation and function of the auxiliary clock frequency H will be described in further detail in conjunction with FIG. 7. The arrangement in FIG. 6 represents an instrumentation of Equation (12). Every time when the signal goes through zero in a region adjacent to normal time instant as defined in FIG. 5, the error is measured at this normal time instant, stored in the sample-and-hold circuit 75 and multiplied with the sampled values of the signals $x_{1k}$ to $x_{Nk}$ determined simultaneously at this normal instant. As the sample-and-hold circuits store the information for a given period, he product, i.e., the output signal of the multipliers 80 to 82, remains constant for a given time. The switches 88 are now closed for a brief time and the integrators 89 integrate over these products for a time given by the auxiliary clock frequency H. The output signals of the integrators appear on the lines 19 to 21 and serve directly for the adjustment of the adjustment coefficients $c_1$ to $c_N$ of the variable elements 30 to 33 in FIG. 2, FIG. 3, and FIG. 4. If the expression described by Equation (12) is greater than zero, a voltage which is greater than zero will thus appear at the corresponding output of the integrator, and $c_j$ is made smaller. If on the other hand the expression described by Equation (12) is smaller than zero, $c_j$ is made larger. "Made smaller" here means rotation in the direction toward the most negative value, "made larger" means rotation in the direction tward the most positive value. This takes place, and for $c_j$ simultaneously, until the quantity given by Equation (12) is equal to zero for each of the outputs 19 to 21. This means that the output signals of the integrators do no longer change as nothing further is added. The variable elements $c_j$ are therefore adjusted to constant, discrete values. If the properties of the transmission channel change during the transmission, the arrangement is capable of following the changes of the channel and to compensate for these changes adaptively.

The switches are advantageously realized by field-effect transistors. The integrators can be realized by capacitively feed-back operational amplifiers with a series-connected resistance. The samle-and-hold circuits are designed with techniques known per se and consist essentially of sampling switches, storage capacitors and buffer amplifiers. Because, as already mentioned, the zero crossings of the signal are to be evaluated only within a limited period at the center of the individual modulation inter-vals, the auxiliary clock frequency H is applied to the switches 88 via a switch 95 only if the sync recovery circuit 11 in FIG. 1 applies a corresponding signal to the switch 95 in FIG. 6 via the line 15. In between, the integrators 89 receive no new input signals, i.e., all the switches 88 are open.

A further possibility consists in designing the correlation computer 12 in such a manner that for adaptively adjusting the variable elements 30, 31, 33, 43 controlled by it, it forms the partial derivatives of the sum of the absolute magnitude of the error amplitudes at the instants of the normal zero crossings 70 to 74 at the center of the modulation intervals in such a manner that the differentiation occurs with respect to the adjustment coefficients $c_j$ associated with these variable elements 30, 31, 33, 43.

The quantity $$D'=\int_{-\infty}^{\infty}|e(t)|dt=\int_{-\infty}^{\infty}e(t)\text{ sgn } e(t)dt \qquad (15)$$

is therefore to become a minimum with $e(t) = Y(t) - a(t)$. Then it must be postulated that $$\frac{\partial D'}{\partial c_j}=\int_{-\infty}^{\infty}\frac{e(t)}{c_j}\cdot\text{ sgn } e(t)dt=\int_{-\infty}^{\infty}x_j(t)\cdot\text{sgn } e(t)dt=0 \qquad (16)$$

or, respectively, $$\sum_{k=-\infty}^{\infty}x_{jk}\cdot\text{sgn } e_k=0 \qquad (17)$$

according to Equation (13) if the signal is viewed only at discrete sampling times $t_k=kT$, which has the effect of minimizing the sum of all the error magnitudes.

With this the implementation is simplified inasmuch as the sample-and-hold circuit 75 shown in FIG. 6 can now be replaced by a comparator circuit which determines only the sign of the error signals $y_k$ appearing at the output 8 of the equalizer at the normal time instants in conjunction with a flipflop in order to store this information for one period of the reference clock frequency M. Only the instantaneous sign information sgn $e_k$ or sgn $y_k$, respectively, appears then on the line 86 in FIG. 6. The mutlipliers 80 to 82 have to multiply the signals arriving on the lines 83 to 85 only by the sign, that is, by +1 or −1. The design of such multipliers is substantially simpler than the design of multipliers for the multiplication of two analog quantities. A multiplier for the multiplication of a quantity with a sign consists essentially of an inverter, a switch and a summing amplifier.

A further simplification of the circuit shown in FIG. 6 can be achieved by designing the correlation computer 12 in such a manner that it determines, for the purpose of adjusting adaptively the variable elements 30, 31, 33, 43 controlled by it, the more frequently occurring sign in the statistical average, of the two possible signs of the partial derivative of the magnitudes of the error amplitudes at the instants of the normal zero crossings 70 to 74, and that the differentiation is performed with respect to the adjustment coefficients $c_j$ associated with these variable elements 30, 31, 33, 43. One therefore forms the quantity $$\text{sgn}\,\frac{\partial|e(t)|}{\partial c_j} = \text{sgn}\,x_j(t)\cdot\text{sgn}\,e(t) \tag{18}$$

or, if the signal is considered only at the times $t_k=k$T, $$\text{sgn}\,\frac{\partial|e_k|}{\partial c_j} = \text{sgn}\,x_{jk}\cdot\text{sgn}\,e_k. \tag{19}$$

For the required change of $c_j$ in order to minimize $$\sum_k |e_k|,$$

we then have $$\Delta c_j \sim -\sum_k \text{sgn}\,x_{jk}\cdot\text{sgn}\,e_k \tag{20}$$

The symbol "≈" means "proportional."

As can be shown, the application of this criterion is always meaningful if random text is transmitted with, in the average, as many negative as positive values. Then it can be assumed that the probability for $e_k$ as well as $x_{jk}$ simultaneously having a positive sign at the sampling times considered is exactly equal to the probability that both quantities have a negative sign. It can further be assumed in the transmission of random text that the probability for $x_{jk}$ being greater than zero is equal to 0.5, i.e., the values $x_{jk}$ assume in the average as many positive as negative values. It can then be shown that if the sum of the distortion errors not dependent on the variable element $c_j$ under consideration and of the possibly occurring noise has a Gaussian distribution with mean value zero (which can be assumed to be the case at least in approximation for the transmission of random text) it applies that for $\Delta c_j>$O the probability that $e_k$ and $x_{jk}$ are simultaneously greater than zero, is greater than one-half; correspondingly, for $\Delta c_j>$O the probability that $e_k$ and $x_{jk}$ are simultaneously greater than zero is smaller than 0.5, with $\Delta c_j$ representing the deviation from the nominal value. With this it is possible to determine the sign of the deviation $\Delta c_j$ according to Equation (20). A minimization of the sum of the absolute magnitudes of all erros is also obtained. In the transmission of digital data it can be assumed as a rule that the data text transmitted has random properties. The occurrence of extended periodic sequences can be avoided by suitable coding, so that as a rule, the conditions required for the applicability of Equation (20) can always be fulfilled.

The application or pure multiplication of signs is particularly advantageous for the implementation. An example of an embodiment for the realization of the computer 12 for the automatic adjustment of the equalizer 5 according to the method described is shown in FIG. 7. All signals $y_k$ and $x_{jk}$ to be processed are first amplified and limited. The information then resides only in the zero crossings of the signals. This amplification and limiting is performed by means of the comparator circuit 100 and 100'. These circuits deliver, for instance, at the output a positive signal as soon as at the input 8 or 17, respectively, in FIG. 7 a signal larger than O V is applied, and deliver an output voltage of approximately O V as soon as the signal at the input 8 or 17, respectively, falls below O V. Such comparator circuits are known. These circuiits consist essentially of an amplifier without feedback with very high open-circuit gain, and their action corresponds to that of a Schmitt trigger with very low hysteresis. By means of the comparator circuit 100 the sign information sgn $y_k$, wich is made available on the line 108, is formed from the signal $y_k$ appearing at the input 8. Similarly, the sign information sgn $x_{2k}$ is determined by means of the comparator circuit 100' from the signal $x_{2k}$ on the line 17. The output of the comparator circuit 100' is connected with the input of the circuit 102. This circuit contains a so-called RS flipflop in conjunction with a gate circuit. The function of this circuit will be de-scribed in more detail later. The reference clock frequency M generated by means of the circuit 13 in FIG. 1 appears on the line 14 and is inverted by means of a NAND gate. The inverted reference clock frequency clock frequency $\overline{M}$ appears on the line 101. The line 101 leads to the control input of the circuit 102. The output of the circuit 102 is connected to the one input of an Exclusive-OR gate 103, whose output leads to the input of a stage 105 which has the same arrangement as the stage 102. At the output of the circuit 103 a small capacity 104 is further connected to ground potential. The reference clock frequency is fed to the control input of the circuit 105 via the line 14. The output signal of the circuit 105 controls the switch 119 via the line 123. The switch 119 is in series with a resistor 122 across which a voltage $+U_x$ is applied. In shunt with the series circuit consisting of the resistor 122 and the switch 119 is connected the further resistor 121, which has twice the value of the resistor 122. The voltage $-U_x$ is applied to the resistor 121. The other end of the resistor 121, and the second terminal of the switch 119 are tied together and lead to another switch 88. The other terminal of the switch 88 is connected to the inverting input of the operational amplifier 124 which is fed back by means of the capacitance 120. The non-inverting input of the operational amplifier is tied to reference (ground) potential. The output of the operational amplifier 124 is connected with the associated variable element 31 via the line 20. The output signal of this circuit therefore controls the adjustment value $c_2$. The line 108 leads to the inputs of two circuits 106 and 107, whose function is the same as that of the circuit 102. The line 101 leads to the control input of the circuit 106, and the line 14 leads to the control input of the circuit 107. The output of the circuit 106 is connected with the second input of the Exclusive-OR gate 103 and with the first input of a further Exclusive-OR gate 110. Likewise, the output of the circuit 107 is connected with one input of an Exclusive-OR gate 109. The line 108 is connected to the second inputs of the Exclusive-OR gates 109 and 110. The output of the Exclusive-OR gate 109 is connected with the input of a circuit 114 and with a capacitance 112 whose other end is at reference potential. The circuit 114 has the same function as the circuit 102, and likewise the circuit 113, the input of which is connected with the output of the Exclusive-OR gate 110 and with a small capacitance 111, whose other end is also at reference potential. The control input of the circuit 113 is connected with the line 14, and the line 101 leads to the control input of the circuit 114. The output of the circuit 113 leads to one input of a NAND gate 115; the output of the circuit 114 leads to one input of a NAND gate 116. One further input of each of the NAND gate 115 and the NAND gate 116 is connected with the line 15. A third input of the NAND gate 115 leads to the line 101, and a third input of the NAND gate 116 to the line 14. The outputs of the NAND gates 115 and 116 lead to the two inputs of a further NAND gate 117. The output of the NAND gate 117 controls the switch 88 via the line 118.

The operation of the circuit shown in FIG. 7 will now be explained with the aid of the timing diagram shown in FIG. 8. The individual pulse trains in FIG. 8 occupy only two states, namely 0 or 1.

For better understanding, the pulse sequences shown in FIG. 8 on lines 301 to 316 are entered in brackets in the circuit of FIG. 7 at the respective points where they appear.

Line 301 shows a distorted, already amplified and limited phase-modulated signal. Because of the amplification and limitation, the signal can assume only two states, where the state 0 will be assigned to the negative sign and the state 1 to the positive sign. In line 301 is therefore contained for all practical purposes the sign information and thereby also the points of the zero crossings of the distorted signal. Because, as already mentioned, a correction of the zero crossings is to be effected in the direction toward the nearest normal time instants 70 to 74, the corresponding, correct, equalized signal looks as shown in line 302. This signal passes through zero only at the desired "normal" time instants. Line 304 shows the reference clock frequency M generated by the circuit 13, which is available on the line 14 in FIG. 1. Line 303 shows the inverted clock frequency $\overline{M}$. The latter is obtained by means of an inverter, not shown in FIG. 7, from the reference clock frequency M and is available on the line 101. The rising flank of the clock frequency M shown in line 304 determines the normal timing raster and it is assumed that the keying ratio, which is here defined as the ratio of mark to space, of the reference clock frequency is 1:1. The reference clock frequency is $n \cdot f_T$, where $n$ is the number of the possible phases of the phase-modulated signal and $f_T$ is the carrier frequency of the phase-modulated signal. In this example it is assumed that the phase of the phase-modulated signal changes, in the case of four-phase keying, by $n \cdot \pi/2$ between two modulation intervals, $n$ being 0, 1, 2, 3, and in the case of eight-phase keying, by $n \cdot \pi/4$, with $n=0 \ldots 7$.

The distortions assumed here are in part not linear and cannot occur in reality. An arbitrary signal was selected here in order to obtain a pulse timing diagram which shows as far as possible all the occurring possibilities. The arrows shown in line 301 show the direction in which the zero crossings must be corrected in each case, toward the normal time instants, which correspond to the positive flank of the reference clock frequency 304. The signal must be deformed by the equalizer correspondingly. Two kinds of regions are distinguished. The region "too early" is situated always to the left of the normal time instant, the region "too late" to the right of it. If a signal passes through zero during a time interval adjoining the normal instant to the right, it passes through zero "too late." The sign (line 301) assumed last by the signal $y(t)$ in thhe interval "too late" is stored by means of a suitable flipflop 107 for the duration of the following interval "too early" (line 305). Similarly, the sign last assumed by the signal $y(t)$ in the inteval "too early" is stored by means of the flipflop 106 for the duration of the following interval "too late." (line 306). The storage times, during which the voltages at the flipflop outputs remain constant, are drawn in bold lines in FIG. 8 for the sake of clarity.

The instants of sampling where the sign to be stored is in each case determined, are indicated in lines 305 and 306 by circular arrows.

The signal on line 305 is continuously compared with the instantaneous signal sgn $y(t)$ in line 301; any deviation of the two signals from each other causes a pulse as per line 307. This is done with the aid of a modulo-2 adder 110 (Exclusive-OR gate). Similarly the signal of line 306 is compared with the instantaneous signal sgn $y(t)$ by means of the Exclusive-OR gate 109. Any deviation of the two signals from each other causes a pulse. The signal sequence generated thereby is shown in line 308.

If thus a zero crossing of the distorted signal $y(t)$ in a region occurs "too early," a pulse appears on line 307. If a zero crossing of the distorted signal in a region occurs "too late," a pulse appears on line 308. If no zero crossing occurs in an interval, a pulse appears neither on line 307 nor on line 308.

The pulses on line 307 are stretched by means of a flipflop 113 into the following interval "too late." The resulting signal is sketched in line 309. Similarly, the pulses on line 308 are stretched by means of the flipflop 114 into the respectively following interval "too early," as may be seen from line 310.

Similarly, the sign last present in the interval "too early" of the distorted signal $y_k$ is stored into the subsequent interval "too late." The signal shown in line 313 results, which agrees with line 306. The same thing takes place with the sign shown on line 311 of the signal $x_{zk}$ at the output of the comparator circuit 100', as is sketched in line 312. The two signals are compared by multiplication of the signs by means of the Exclusive-OR gate 103 and furnish the signal shown in line 314. The sign which this signal assumed in the interval "too late" is stored into the respectively following time slot "too early" by means of the flipflop 105.

The result is the product of the signs at the respective sampling point, stored until the next sampling point. The resulting signal is shown in line 315.

The evaulation now proceeds as follows:

The product of the signs which was obtained for the respective last standard time instant operates the switch in the integrator 119 via the line 123. This, however, has no effect as long as the switch 88 is open. The switch 88 conducts only if a 1 is present in the interval "too early" on line 307 of FIG. 8. In that case an early zero crossing took place; the position of the switch 119 is determined by whether at the next normal time instant the sign of the product sgn $e_k$·sgn $x_{jk}$ was greater or smaller than zero. If a 1 is present in the interval "too late" on line 308, the switch 88 also conducts. In that case a late zero crossing was present; the position of the switch 119 is determined by whether at the preceding normal time instant the sign of the product sgn $e_k$· sgn $x_{jk}$ was greater or smaller than zero.

If the switch 88 conducts, one current pulse of precisely defined width will always flow into the integration capacitance C, with a polarity corresponding to the product sgn $e_k$· sgn $x_{jk}$ at the normal time instant. The output quantity of the integrator controls the adjustment coefficient $c_2$ of the variable element 31 in known fashion so that $$\overline{\sum_k |y_k|} = \overline{\sum_k |e_k|} \rightarrow 0$$

Similarly all the other variable elements 30 to 33 and, if applicable, 43 are adjusted. It is advantageous to realize the variable elements in the form of a variable voltage divider in which the variable resistance is implemented by a field effect transistor, for instance, in conjunction with an inverting amplifier that can be added, in order to be able to realize also negative signs of the adjustment coefficients $c_j$. It should be noted at this point that the arrangement shown in FIG. 7 for the generation of the signals shown on line 316 of FIG. 8 can also be used in conjunction with FIG. 6. In that case the control line 118 leads to the line 87 in FIG. 6; the switch 95 with the control line 15 is omitted there. The pulses on line 316 of FIG. 8 then control the switches 88 in the circuitit according to FIG. 6 and open these switches only at the nominal instants in time at the center of a modulation interval for a definite time if a zero crossing in the vicinity of a normal time instant has occurred.

The operation of the circuits 102, 101, 106, 107, 113, 114 and 105, given in the block diagram of FIG. 7, will noww be explained in detail.

The sign sgn $y_k$, which $y(t)$ had last assumed in the interval "too early," is stored for the duration of the following interval "too late." This is done by means of a so-called RS flipflop 106 in conjunction with a gating circuit.

The circuit 106 is shown in detail in FIG. 9. The line 108 from the output of the comparator circuit 100 here leads to the input of a NAND gate 210 used as an inverter and at the same time to one input of a NAND gate 211. Thee inverted reference clock frequency $\overline{M}$ is fed via the line 101 to the second input of the NAND gate 211 and at the same time to one input of the NAND gate 213. The output of the NAND gate 212 leads to one input of a NAND gate 214. The output of the NAND gate 213 is connected with the other input of the NAND gate 214. At the same time the output of the NAND gate 214 is connected with the second input of the NAND gate 213. The output of the NAND gate 213 is designated with 200 and forms at the same time the output of the circuit 106 in FIG. 7. If a 1 is present at the control line 101, the information appears at the output 200 which is present at the input 108, i.e., the output signal of the flipflop follows the input signal. If a zero is applied to the control line 101, the information last present at the output 200 prior to the switching over of the control line 101 to zero remains intact. The flipflop therefore stores the state present at the input 108 when the zero arrives on the line 101. The flip-flop output can change its state again and followw the input 108 only when a 1 appears at the control line 101.

Similarly, sgn $y_k$ is stored for the duration of the interval "too early" by means of the signal 304. The output signals of the RS flipflops 106 and 107 are continuously compared with the input signal by mod-2 addition. At the output of the mod-2 adders 110 and 109 the signals shown in FIG. 8, line 307 and 308, appear. These are stretched by means of two further, already described, flipflops 113 and 114, which are provided with gate circuits, the signals 303 and 304, respectively, again serving as gating pulses. In order to assure reliable transfer, the rise times of the pulse flanks at the output of the respective mod-2 adders are slowed somewhat by means of small capacitances which are designated with 104, 111 and 112 in FIG. 7. Subsequently, the two partial signals are clocked by means of the signals shown on lines 303 and 304 of FIG. 8, are combined and control the switch 88 of the integrator. A similar circuit generates the control signals for the switch 119.

To the terminal 15 in the circuit according to FIG. 7 must be applied a suitable auxiliary clock frequency which during the transitions between the individual modulation intervals opens the switch 88, so that the corresponding irregular zero crossings in the vicinity of these transitions are not also evaluated.

The adjustment behavior of the automatic equalizers described above can be influenced to advantage, i.e., the speed of adjustment can be increased, by making the adjustment of all N variable elements 30 to 33 in FIG. 2 in steps of variable size in such a manner that the width of the steps decreases with increasingly improved adjustment of the equalizer 5. At the start, the distortions will be large and it is important to obtain a coarse adjustment quickly. With better adjustment of the equalizer, the width of the steps can be reduced further and further. This has the result that the fine adjustment, although more slowly, takes place more accurately, as for a change in $c_j$ by $\Delta c_j$ more steps are now required. Thereby the integration or summation limits in Equations (13), (17) and (20), respectively, are approached more closely, so that the adjustment becomes more accurate.

The described method and system for the adaptive equalization of phase-modulated data signals has the advantage that the signal can be equalized without the need for prior demodulation. The entire equalization arrangement precedes the demodulator. Furthermore, it is not necessary that the equalizer and the demodulator be physically at the same place. For instance, a phase-modulated data signal can be equalized and immediately sent on to another transmission path. Moreover, coherent demodulation is not required, i.e., it is not necessary to regenerate at the receiving location a reference carrier of known frequency and known phase; the method functions also with so-called phase-difference modulation, where the information is contained in the change of the phase in the transition from one modulation interval to the next. The equalizer is capable of compensating also for changes in the transmission channel during transmission. As all variable elements in the equalizer are adjusted simultaneously, quick automatic adjustment is achieved. As furthermore the reference clock frequency is determined via the reference clock generator 13 from thhe distorted data signal at the input of the equalizer no mutual coupling of the control circuits for the recovery of the reference clock frequency and for the adaptive adjustment of the equalizer cannot occur. The described equalizer also affords so designing the computer that only multiplication of analog quantities by signs, or even multiplication of signs by one another, is necessary, for which reason the entire system can largely be instrumented in a simple manner with digital means.

To those skilled in the art, it will be obvious from a study of this disclosure that my invention permits of various modifications and may be given embodiments other than those particularly illustrated and described herein, without departing from the essential features of the invention and within the scope of the claims annexed hereto.

I claim:

1. An automatic equalizer system for phase-modulated data signals with random properties, which is provided on the receiving side of a band-limited transmission channel and connected to a receiver via a demodulator, said system comprising an equalizer, the equalizer having input means which are the input means of the fliter members and an output and having the structure of a filter bank formed of N filter members with input means and N respective outputs; a computer comprising means for influencing the equalizer to minimize the distortions in the phase-modulated data signals at the time points of the normal zero crossings of the equalized phase-modulated data signal at the center of the modulation intervals, N-1 of said filter outputs being connected to the inputs to said computer; N variable circuit elements and an adder having inputs and outputs, all of said N filter outputs being connected via said respective N variable elements to the inputs of said adder; a sync recovery circuit, a reference clock with synchronizing means, the output of the transmission channel being connected to said computer on the one hand via said sync recovery circuit and on the other hand vai said reference clock, N-1 outputs of said computer being associated with those N-1 variable elements whose inputs simultaneously lead to the inputs of said computer whereby said variable elements are adaptively adjusted; and automatic gain control means connecting the out-put of said equalizer to that variable element of the equalizer which is associated with the one remaining filter member whose output is not connected to said computer.

2. In an equalizer system according to claim 1, said filter bank being formed of a filter chain network having taps which constitute said respective filter outputs.

3. In an equalizer system according to claim 2, the filter members contained in said filter chain being formed of delay elements; the input of said filter chain being connected, on the one hand, directly with said computer and on the other hand via an additional variable member with said adder contained in the equalizer; said additional variable element being under control by said computer.

4. In an equalizer system according to claim 1, said filter bank containing a chain of delay elements, each of which has a delay T equal to the duration of one modulation interval; a further filter (F(ω); 445) connected with each tap and with the input and the output of the chain of delay elements; the taps of the chain of delay elements, the input and output of the chain and also the outputs of said further filters (F(ω); 445) being connected via variable elements (43, 30 to 33, 443, 430 to 433) with the inputs (35 to 39, 501, 401, 435 to 439) of said adder (40); and said further filters (F(ω); 445) being wide-band 90° phase shifters (FIG. 4).

5. In an equalizer system according to claim 1, said filter bank containing a chain of delay elements (444), each of which has a delay T equal to the duration of a modulation interval; a further filter (F(ω); 445) connected with each tap and with the input and output of the chain of delay elements (444), the taps of the chain of delay element (444), the input and output of the chain and also the outputs of said further filters (F(ω); 445) being connected via variable elements (43, 30 to 33, 443, 430 to 433) with the inputs (35 to 39, 501, 401, 435 to 439) of an adder (40); said further filters (F(ω); 445) being formed of differentiating circuits (FIG. 4).

6. In an equalizer system according to claim 5, said further filters being formed of integrating circuits.

7. In an equalizer system according to claim 5, said further filters being formed of all-pass circuits.

8. An equalizer system according to claim 1, comprising single-side band modulation means for subjecting the signal to a frequency-translation prior to equalization.

9. In an equalizer system according to claim 1, said computer comprising means for forming, for adaptive adjustment of said variable elements (30, 31, 33, 43, 443, 430 to 433), the partial derivatives of the sum of the error squares at the time points of the normal zero crossings (70 to 74) at the center of the modulation intervals thereby performing a differentiation with respect to the coefficients $c_j$ associated with said variable elements (30, 31, 33, 43, 443, 430 to 433).

10. In an equalizer system according to claim 1, said computer (12) comprising means for forming, for the adaptive adjustment of the variable elements (30, 31, 33, 43, 443, 430 to 433), the partial derivatives fo the sum of the absolute magnitudes of the error amplitudes at the time points of the normal zero crossings (70 to 74) at the center of the modulation intervals thereby performing a differentiation with respect to the coefficients ($c_j$) associated with said variable elements (30, 31, 33, 43, 443, 430 to 433).

11. In an equalizer system according to claim 1, said computer (12) comprising means for determining, for the adaptive adjustment of the variable elements (30, 31, 33, 43, 443, 430 to 433), that one sign of the two possible signs of the partial derivatives of the absolute magnitudes of the error amplitudes, which occurs more frequently in the statistical average at the instants of normal zero crossings (70 to 74) thereby performing differentiation with respect to the coefficients ($c_j$) associated with said variable elements (30, 31, 33, 43, 443, 430 to 433).

12. An equalizer system according to claim 1, comprising means for incrementally performing the adjustment of all of said variable elements (30 to 33, 43, 430 to 433, 443) in steps of variable width, in the width of said steps decreasing with increasingly improved adjustment of said equalizer (5).

* * * * *